A. M. PIGEON.
KNITTING MACHINE.
APPLICATION FILED SEPT. 21, 1916.
1,330,818.
Patented Feb. 17, 1920.
7 SHEETS—SHEET 7.
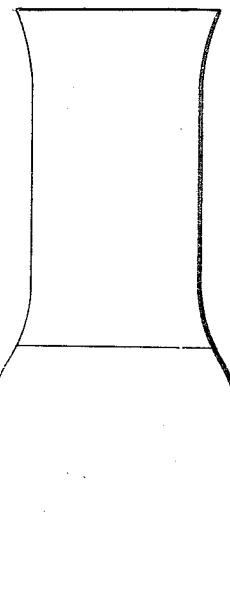
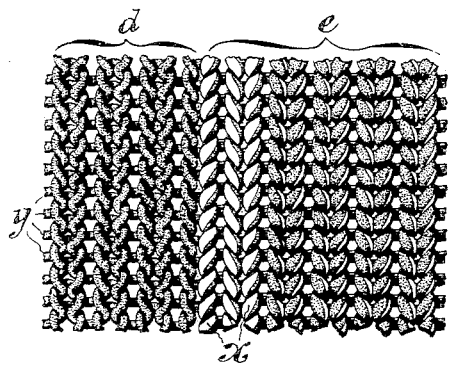
FIG. XVII
FIG. XVI
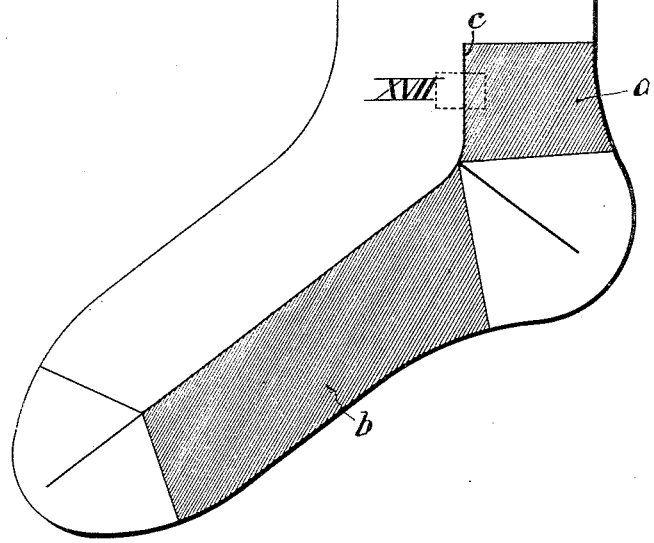
Witnesses
John C. Bergner
James H. Bell
Inventor
Albert M. Pigeon,
By Foley & Paul
Attorneys.

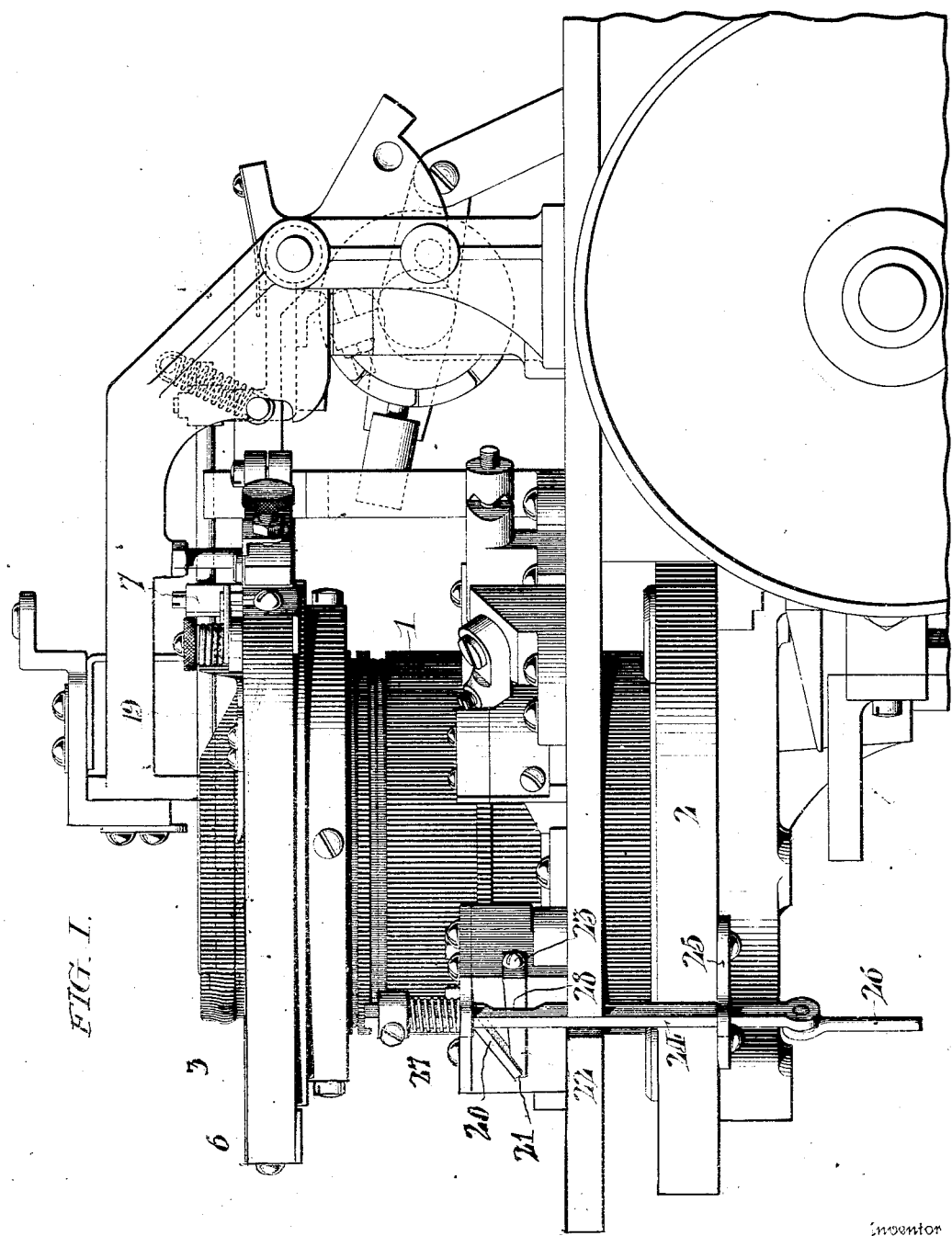

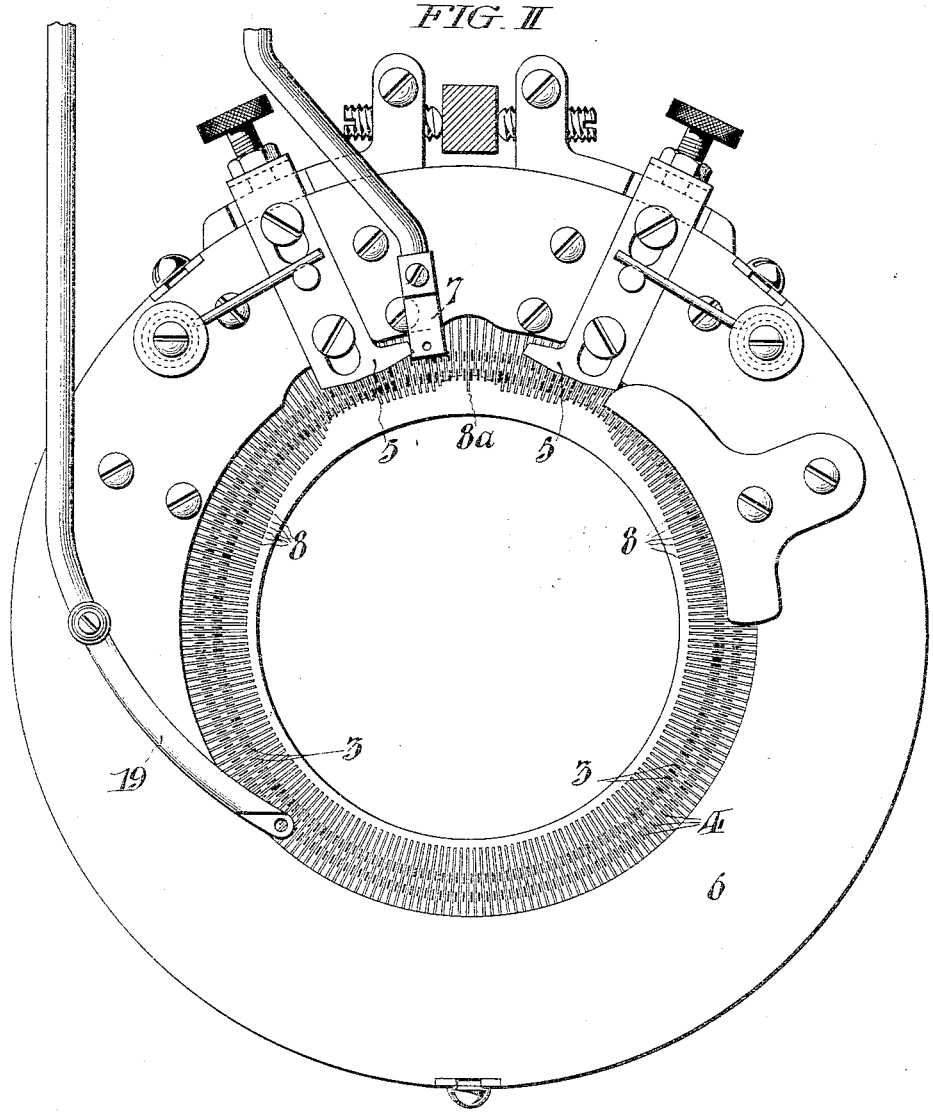
FIG. II
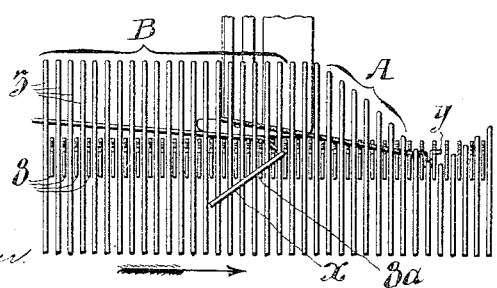
FIG. XIV

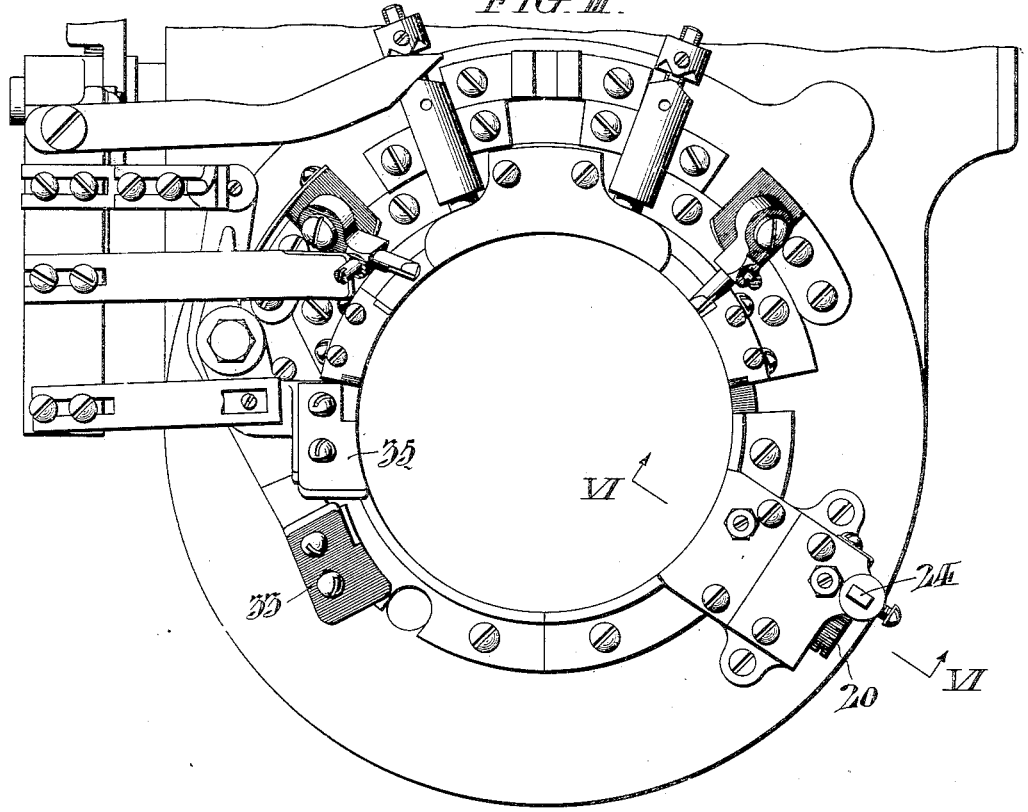
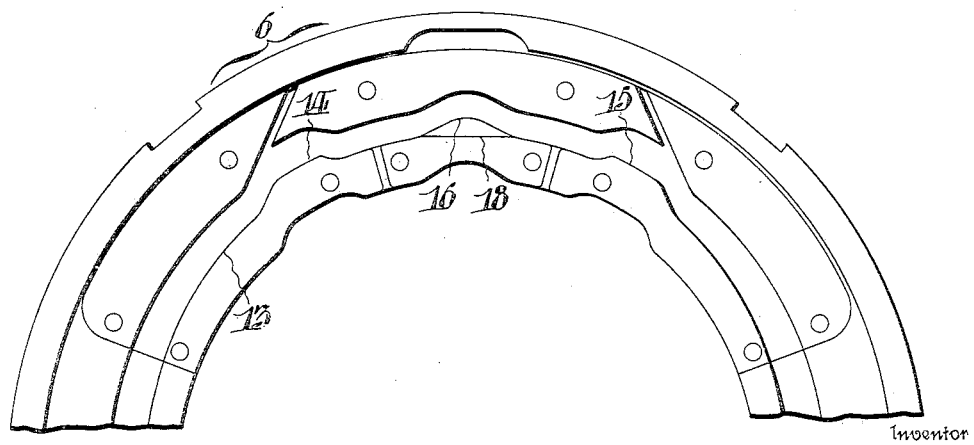

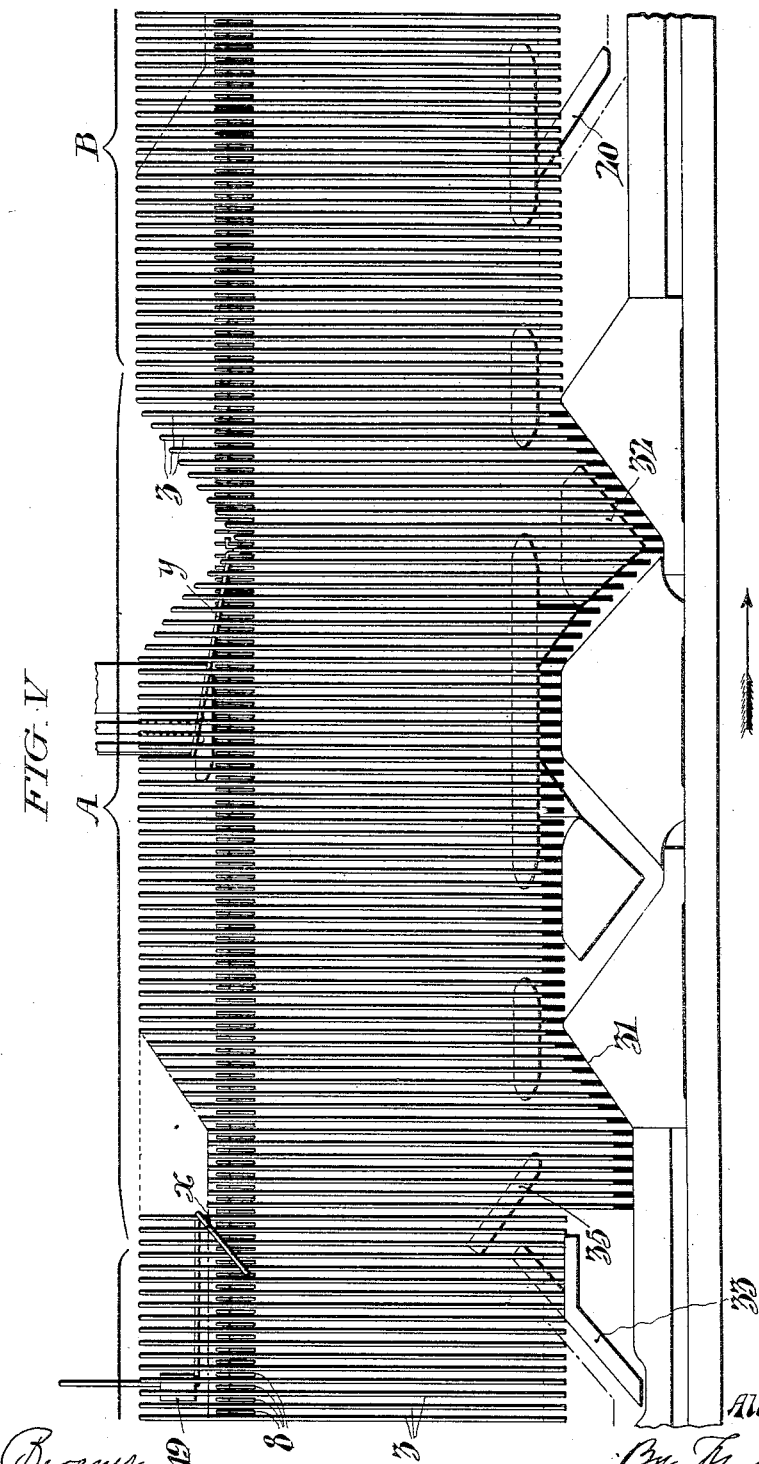

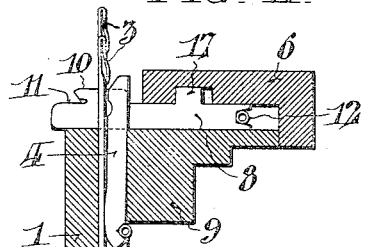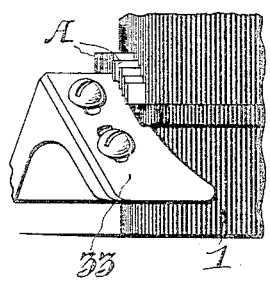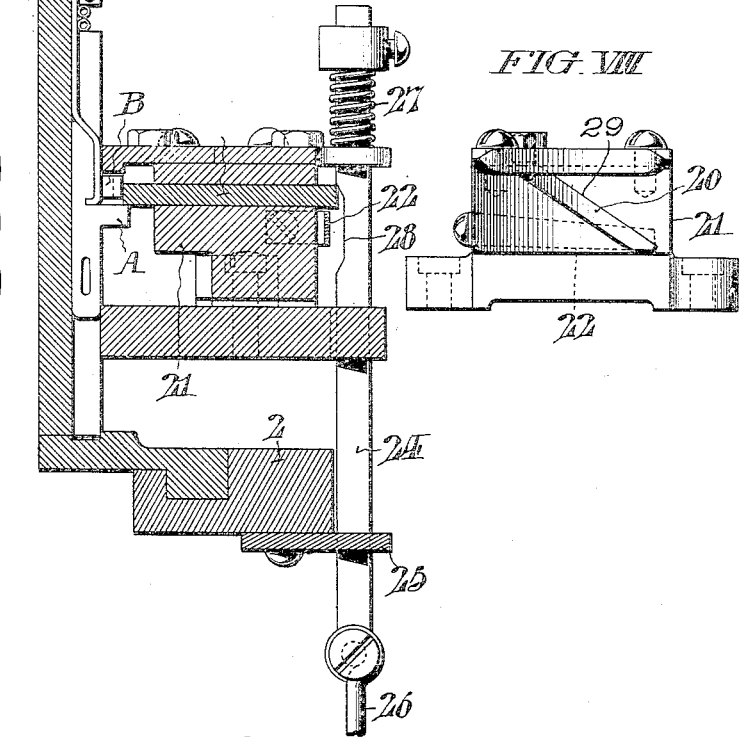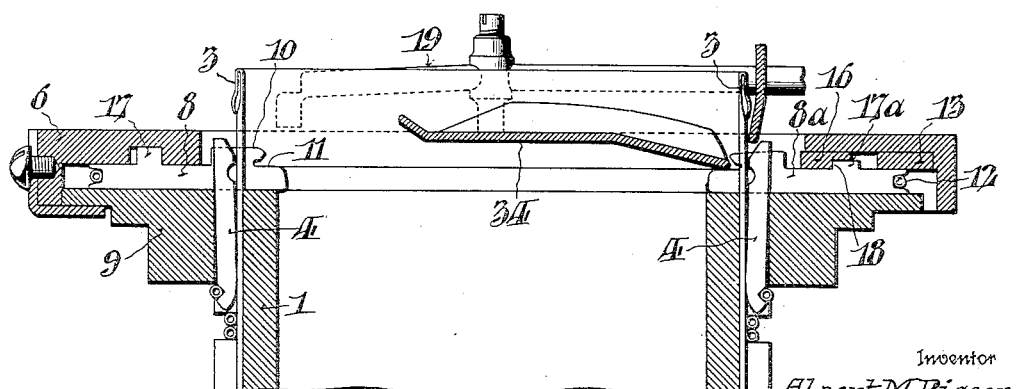

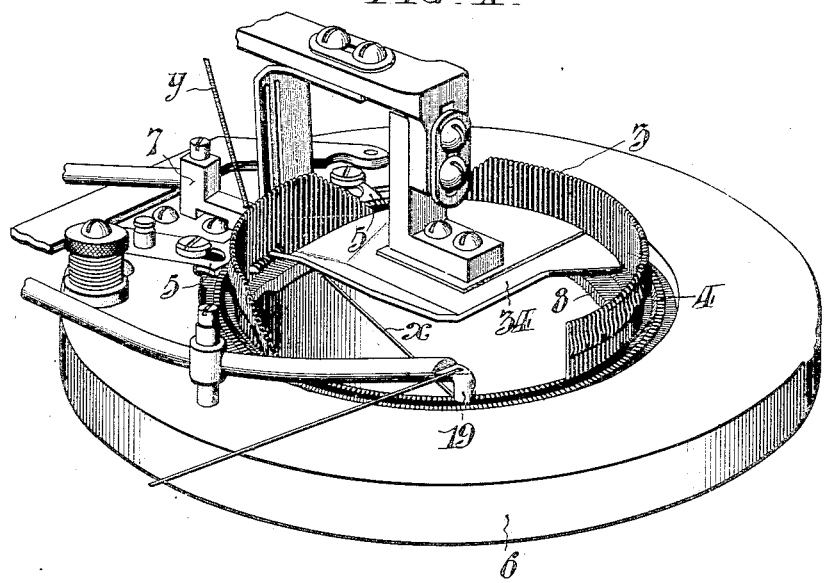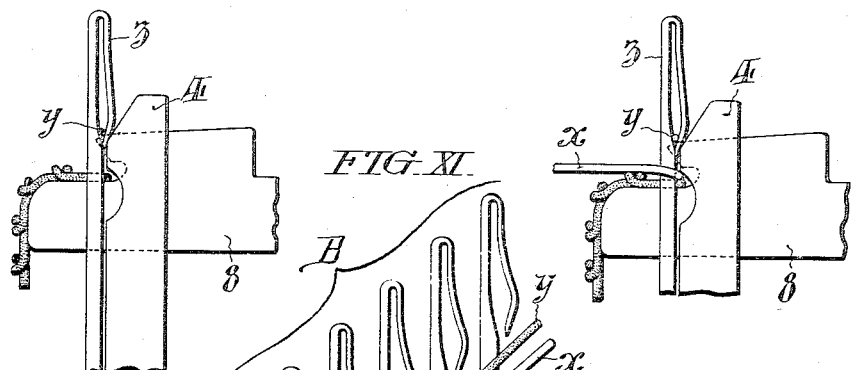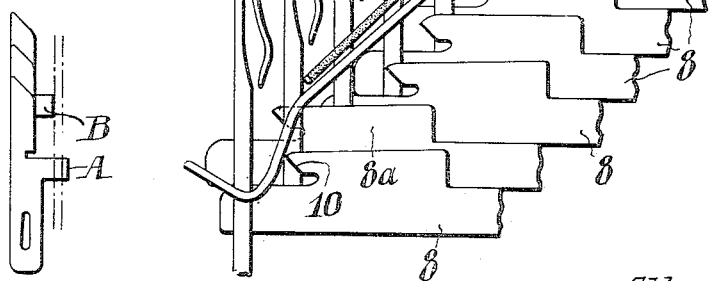

UNITED STATES PATENT OFFICE.

ALBERT M. PIGEON, OF NORRISTOWN, PENNSYLVANIA, ASSIGNOR TO WILDMAN MFG. CO., OF NORRISTOWN, PENNSYLVANIA, A CORPORATION OF PENNSYLVANIA.

KNITTING-MACHINE.

1,330,818.  Specification of Letters Patent.  Patented Feb. 17, 1920.

Application filed September 21, 1916. Serial No. 121,404.

*To all whom it may concern:*

Be it known that I, ALBERT M. PIGEON, of Norristown, in the county of Montgomery and State of Pennsylvania, have invented certain new and useful Improvements in Knitting-Machines, whereof the following is a specification, reference being had to the accompanying drawings.

The invention relates more particularly to a knitting machine having a needle cylinder which is adapted to rotate for circular knitting and to oscillate for knitting the heel and toe pockets of stockings or the like.

An object of the invention is to provide a knitting machine wherein a splicing yarn may be fed to a portion of the needles in connection with a main or body yarn in such a manner as to produce perfect plating, wherein the main or body yarn substantially at all times appears upon the face of the resulting fabric.

These and other objects will in part be obvious, and will in part be hereinafter more fully described.

In the drawings which show by way of illustration one embodiment of the invention, Figure I, is a side elevation of a knitting machine, conveniently illustrating the principles comprised by my invention.

Fig. II, is a plan view of the needle cylinder, and yarn supporter dial.

Fig. III, show a plan view of the needle cam ring.

Fig. IV, is an inverted plan of a portion of the cap plate for the yarn supporter dial, illustrating the cams for operating the supporters.

Fig. V, illustrates in a diagrammatic development upon a plane surface, the relation of the needles and the cams by which they are actuated.

Fig. VI, is a partial sectional elevation through the needle cylinder and cam ring showing more particularly the devices for actuating the cam for controlling the action of the long butt needles during the reinforcing of the high heel and sole of the stocking.

Fig. VII, is a partial detail sectional view through the upper end of the needle cylinder and yarn supporter dial showing the relation of the splicing yarn feed and the plate for depressing the splicing yarn.

Fig. VIII, is a detail view of the inner face of the depressing cam for the long butt needles.

Fig. IX, is a fragmentary detail of the elevating cam for the long butt needles employed during oscillatory knitting.

Fig. X, illustrates in perspective the organization for simultaneously feeding the body and splicing yarn to the needles during the knitting of the high heel and sole of the stocking.

Fig. XI, is a diagrammatic view showing the manner of depressing the reinforcing yarn with respect to the body yarn in feeding them to the needles to properly determine their relation in the finished fabric to produce perfect plating.

Fig. XII, is a detail view illustrating the normal function of the first short butt needle and its co-acting beard, presser and yarn supporter.

Fig. XIII, is a similar view to Fig. XII, showing these related elements in the performance of their special functions.

Fig. XIV, is a diagrammatic view further illustrating the relation of the body and reinforcing yarn during their feeding to the needles.

Fig. XV, shows in juxtaposition the two types of needle jacks comprised by my invention.

Fig. XVI, is a view of a stocking knit in accordance with my improvements.

Fig. XVII, is a diagrammatic view of the portion of the knit web bounded by the rectangle indicated in dotted lines at XVII in Fig. XVI.

In carrying out the invention, I have applied my improvements to a knitting machine consisting of a needle cylinder adapted to be rotated to produce plain tubular knitting or oscillated to form heel or toe pockets for stockings or the like. The needles employed are of the spring beard type. Suitable yarn supporters and beard depressors coöperate with the needles in the knitting operation. In the production of certain classes of hosiery, the greater portion of the stocking is knit of a silk yarn, which is supplemented in knitting certain reinforced portions, by a yarn usually of cotton. If two such yarns are simultaneously fed to the needles without any definite feeding relation between them, the resulting fabric is invariably streaky in appearance due to the contrast in luster of the character of yarns employed, that is, the cotton will at some points be more prominent upon the face of the fabric, while at others, the silk is more predominant. In order that the silk yarn only may appear upon the surface of these reinforced portions of the fabric, I have provided suitable controlling devices so that in feeding the reinforcing yarn to the needles, said reinforcing yarn is at all times fed to the needles beneath the main or body yarn, and this results in effecting perfect plating and producing the desired result in the finished fabric. This is accomplished by two coöperative elements, one consisting of a special yarn supporter which is located at the point where the reinforcing yarn is first fed to the needles, this special yarn supporter being projected between the needles, so that the other yarn supporters coöperating therewith at a certain point in the travel of the cylinder will cause the reinforcing yarn to be caught about the special yarn supporter and positively carried forward and fed to the needles beneath the main yarn. The other element coöperating with this special yarn supporter, is a depressing plate which carries the yarn below the ordinary retracted yarn supporter directly in advance of the special supporter, so that when this ordinary yarn supporter is brought forward, it will positively anchor the reinforcing yarn in its web holding notch and as a result, the reinforcing yarn will be fed to the succeeding needles below the main or body yarn, thereby establishing the positive relation between these two simultaneously fed yarns which results in perfect plating. The above elements are used in a machine wherein the needles at predetermined periods are subdivided into groups which travel in separate and distinct paths, so that one group or series of needles may be caused to take only the main or body yarn, while the others are simultaneously supplied with both the body and reinforcing yarn. This subdivision of the needles is accomplished by the use of long and short butt needles in a manner well-known in this art.

By the coöperation of the special yarn supporter with the first needle of the series to which the reinforcing yarn is fed and a yarn depressing plate, I am able to so anchor this reinforcing yarn as to be fed to the needles beneath the main or body yarn.

Referring more in detail to the drawings, I have shown my invention applied to a knitting machine having a needle cylinder 1, which is mounted to rotate or oscillate in a supporting bed 2. This needle cylinder is provided with spring beard needles 3 which are divided into two series as diagrammatically shown in Fig. V, of the drawings. The needles in the series A are the long butt needles and the butts of this series are indicated by the heavy black lines. The needles of series B are the short butt needles, and the butts of these needles are indicated by blank spaces.

The long butt needles will be referred to hereafter as the A needles, and the short butt needles as the B needles. As above noted, the needles are all of the spring beard type, and coöperating with each of them is a beard depressor 4. The beard depressors are actuated by adjustable cams 5, 5, which are mounted on the top of the cam ring 6, at the upper end of the needle cylinder. These beard depressors and their operating mechanism form no part of the present invention, and as they may be of the well known type, further description thereof is not thought necessary.

The main yarn is fed to the needles from a yarn guide 7, which is located close to the needles and at a low level, so that the yarn between the stitching point and the yarn guide is drawn against the shanks of the needles well below the beards of the needles when they are at their highest level. The yarn is supported by yarn supporters 8, which are mounted to slide in radial slots in a supporting ring 9, secured to the upper end of the cylinder and these yarn supporters are provided with a projecting yarn supporting ledge 10, and a fabric supporting ledge 11. The tip or end of the yarn supporting ledge overhangs the fabric supporting ledge with an intervening notch which receives the top course of the knit fabric and prevents it from rising with the needles. At the time when the needles descend to engage the yarn, the yarn supporters are positioned so that their projecting tips extend slightly within the line of the needles and the yarn rests on this supporting ledge. The yarn supporting ledge holds the yarn positively spaced vertically from the loops of the knitted fabric, so that the beard of the needle may be depressed after it passes the yarn being fed, and before it is withdrawn from the fabric loop. These yarn supporters are moved radially toward the center of the needle cylinder by a spring 12, while they are retracted, or moved outwardly against the tension of the spring by a cam 13, secured to the underside of the cam ring 6. This cam 13, has projecting portions 14, and 15, located at the stitching points, one projection being effective when the needle cylinder moves in one direction and the other cam being effective when it is moving in the other direction. Intermediate between the cams 14, and 15, is a further projecting portion 16, which operates to withdraw the yarn supporters engaged by it so that their tips are entirely outside of the line of needles. This withdrawing of the yarn supporters to the extent stated facilitates the reversing of the yarn as the cylinder oscillates. The yarn supporters are provided with projecting butts, to coöperate with the respective cam portions, the butts of the main group being indicated at 17, in Fig. VI, and being of such vertical projection that all portions of the cam 13, engage them. The special yarn supporter indicated at 8ᵃ, in Fig. VII, of the drawings, is provided with a short butt 17ᵃ. The projecting portion 16, of cam 13, is cut away on its underside as indicated at 18, with the result that the special yarn supporter 8ᵃ will not be engaged by the projection 16, and this leaves the yarn supporter at its extreme inner position, projecting well within the line of the needles as shown in Fig. II. This short butt, however, will be engaged by the projections 14, and 15, at the stitching points, and said special yarn supporter will be operated in precisely the same manner as the other yarn supporters at these periods.

The special yarn supporter 8ᵃ, is located between the two leading needles of the B group. The splicing yarn guide is indicated at 19. In Fig. XI, I have shown the main yarn at $y$, and the reinforcing yarn at $x$, The main or body yarn $y$, is usually of silk and is fed through the main yarn guide 7, and directed to the needles in the usual manner. The reinforcing yarn $x$, may be of cotton, and is fed through the yarn guide 19.

Coöperating with the long butt needles only is a dividing cam 20, which is mounted on a suitable support 21. Said cam is normally withdrawn from engagement with the needle butts by means of a spring 22, which is secured to the support 21, by a screw 23. A rod 24, is adapted to reciprocate in a guide 25, and is connected by a link 26, to a pattern controlled mechanism, so that at the proper time in the operation of the machine, said rod 24, may be pulled down, and when released a coiled spring 27, raises the same. On the inner face of this rod 24, is a recess 28. When the rod is raised, the recess registers with the cam 20, and permits the spring 22, to retract the latter. When the rod is drawn down, the said rod engages the said cam, and forces the same into active position. Cam 20, rests in an inclined guide-way 29, in the support 21, see Fig. VIII. At the period of insertion of the reinforcing yarn, the link 26 is lowered, which forces the cam 20, in toward the needle cylinder to active position. When in active position, it will engage all the long butt needles and lower them as the cylinder rotates, thus dividing the series of long butt needles from the series of short butt needles. This division of the needles causes the splicing yarn $x$, to be wrapped about the advance needle of the B needles, as clearly shown in Fig. V, of the drawings, as a consequence of which the yarn will be fed to all the B needles. After the reinforcing yarn is wrapped about this needle, the long butt needles are raised by the cam 31, to active or knitting position, as clearly shown in Fig. V. The direction of travel of the needles is indicated by the arrow in this figure and as the needles continue their movement, they engage the stitch cam 32.

The cam 33, shown in Fig. V, of the drawings is the raising cam which becomes effective when the cylinder is oscillated in knitting the heel and toe pockets. This cam is withdrawn from active engagement with any of the needles during the plain tubular knitting as above described.

After the reinforcing yarn has been wrapped around the advance needle of the series B, it will be carried along by said needle as clearly shown in Figs. V, XI, and XIV. Before the knitting point is reached, all of the yarn supporters except the special yarn supporter 8ᵃ are withdrawn. This occurs midway between the two stitching points, and while this special yarn supporter is held advanced, (see Figs. II and XI) the floated portion of the reinforcing yarn is depressed by a plate 34, as shown in Fig. X, below the upper lever of the yarn supporter. In this manner, the floated portion of the yarn is held depressed, so that when the ordinary yarn supporter directly in advance of the special yarn supporter 8ᵃ again moves in, the projecting yarn supporting surface 10, thereof will move over the reinforcing yarn, and anchor the same in its web holding notch (see Figs. XI and XIV). The reinforcing yarn is thus locked by this yarn supporter and held directly on the upper face of the succeeding yarn supporters. As the needles move along the reinforcing yarn is positively fed to them below the main or body yarn $y$, which results in laying the cotton reinforcing yarn so as to appear only on the inner surface of the knitted fabric, thus producing perfect plating with only the silk yarn appearing on the outer face of this portion of the knitted fabric. By the combined operation of the division of the needles and the laying of the reinforcing yarn around the same end needle at each rotation of the cylinder, the positive gripping of the reinforcing yarn by the yarn supporters and the feeding of the reinforcing yarn to the needles below the main or body yarn, I am able to lay with certainty the loops formed in the body yarn and the reinforcing yarn, and to secure the perfect plating referred to above.

While the reinforcing yarn $x$, is being laid around the end needles of the series B, the fabric supporter between the first two needles of the series is withdrawn, so that the reinforcing yarn is not engaged by the first needle of the series B. This, however, while convenient, is unimportant.

When the needle cylinder is oscillated for knitting the heel and toe pockets, the raising cam 33, is thrown into operation and the depressing cam 35, is withdrawn. This raising cam is so shaped as to engage the long butt needles and raise the same to idle level, and, therefore, the heel and toe pockets are knit entirely on the short butt or B needles which preferably constitute half the needles of the cylinder.

In Fig. XVI, I have shown a stocking knit with my improved mechanism. The sections indicated at *a* and *b* are provided with the reinforcing yarn. The line indicated at *c* (which has been termed the median line) is the dividing line between the knitting effected by the short butt needles on which the heel and toe pockets are knit and the knitting effected by the remaining needles of the machine.

In Fig. XVII of the drawings I have shown a section through the fabric wherein the portion *d* is the portion of the stocking knit with the body yarn alone, while the portion *e* indicates the reinforced portion. It will be apparent from this figure that the reinforcing yarn is repeatedly inserted with certainty, and that the resulting fabric is perfectly plated, the reinforcing yarn appearing only on the inner face of the fabric. From the above description it will be apparent that I have provided coöperating devices which enable a splicing yarn to be inserted at a predetermined region in the knitting of the stocking, while so definitely securing the relative positions of the yarns that perfect plating is accomplished. This is accomplished by depressing the reinforcing yarn and positively feeding it to the needles below the main or body yarn. The preferred instrumentality is the depressing plate which directs the reinforcing yarn in to the web holding notch of one of the yarn supporters, so that it is engaged thereby, thus utilizing an element which is present in the machine for other purposes.

It will be obvious that minor changes in the details of construction and the arrangement of parts may be made without departing from the spirit of the invention as set forth in the appended claims.

Having thus described my invention, I claim:

1. A knitting machine, including in combination, a needle cylinder; needles carried thereby; a yarn guide for directing a body yarn to the needles; a guide for a reinforcing yarn; means for dividing the needles, whereby the reinforcing yarn is laid about the shank of a predetermined needle; means projecting between the needles at the end of the reinforcing series around which the reinforcing yarn may be laid; and a depressing member operating on the reinforcing yarn for depressing the same around said projecting member, and adapted to insure the reinforcing yarn being fed to the succeeding needles below the body yarn.

2. A knitting machine, including in combination, a needle cylinder; needles carried thereby; a yarn guide for directing a body yarn to the needles, a guide for a reinforcing yarn; means for dividing the needles, whereby the reinforcing yarn is laid about the shank of a predetermined needle; yarn supporters for supporting and positioning the yarn; means for moving said yarn supporters radially of the cylinder, and for withdrawing the main series of yarn supporters from between the needles, while allowing the protrusion of a special yarn-supporter at the end of the series of reinforcing needles; and a depressing plate for carrying the reinforcing yarn over said special yarn supporter and underneath the next adjacent yarn supporter in advance whereby said reinforcing yarn is securely held positioned so as to insure its being fed to the succeeding needles below the body yarn.

In testimony whereof I have hereunto signed my name at Philadelphia, Pennsylvania, this twentieth day of September, 1916.

ALLBERT M. PIGEON.

Witnesses:
   JAMES H. BELL,
   E. L. FULLERTON.